United States Patent [19]
Li et al.

[11] Patent Number: 6,094,631
[45] Date of Patent: Jul. 25, 2000

[54] METHOD OF SIGNAL COMPRESSION

[75] Inventors: Yongming Li; Xiaodong Wu; Hongyi Chen, all of Beijing, China

[73] Assignee: Winbond Electronics Corp., Hsinchu, Taiwan

[21] Appl. No.: 09/112,949

[22] Filed: Jul. 9, 1998

[51] Int. Cl.[7] .................................................. G10L 21/04
[52] U.S. Cl. .......................... 704/230; 704/229; 704/500; 382/238; 382/239
[58] Field of Search .................................... 704/230, 500, 704/501, 502, 503, 504, 229; 382/236, 238, 239, 244, 246, 248

[56] References Cited

U.S. PATENT DOCUMENTS

| | | | |
|---|---|---|---|
| 5,649,053 | 7/1997 | Kim | 704/500 |
| 5,682,152 | 10/1997 | Wang et al. | 341/50 |
| 5,754,793 | 5/1998 | Eom et al. | 395/200.77 |
| 5,764,805 | 6/1998 | Martucci et al. | 382/238 |
| 5,794,179 | 8/1998 | Yamabe | 704/205 |
| 5,845,243 | 12/1998 | Smart et al. | 704/230 |
| 5,867,602 | 2/1999 | Zandi et al. | 382/248 |

*Primary Examiner*—David R. Hudspeth
*Assistant Examiner*—Susan Wieland
*Attorney, Agent, or Firm*—Thomas, Kayden, Horstemeyer & Risley

[57] ABSTRACT

A method of signal compression. An input signal is divided into a plurality of segments. Each of the segments is decomposed by wavelet packet transform to a plurality of levels, so that each of the segments is in a form of a group of coefficients in each of a plurality of domains corresponding to each of the levels. Each of the domains is divided into a plurality of sub-domains to calculate a degree of characteristic concentration corresponding thereto. One of the domains having a highest degree of characteristic concentration is select to perform bit allocation and quantization, so that the group of coefficients in the selected domain is represented as an information. The information is formatted into a frame for transmission, and then the frame is output.

11 Claims, 5 Drawing Sheets

METHOD OF SIGNAL COMPRESSION

BACKGROUND OF THE INVENTION

1. Field of the Invention

The invention relates in general to a method of signal compression, and more particularly, to a method of signal compression in multi-domains based on wavelet packet transform.

2. Description of the Related Art

Wavelet transform or wavelet packet transform has been proved to be a very useful technique for time-varying signal analysis and process, especially in image compression and audio compression. The wavelet transform is developed based on Fourier analysis. Due to a much better time-frequency resolution compared to the Fourier transform, a better localization property in both time domain and frequency domain is obtained. Therefore, the wavelet transform and the wavelet packet transform have great effects on signal analysis and measurement, image process, speech process, and automatic control. By employing wavelet transform or wavelet packet transform for signal process, for example, for speech compression, a wide applicability, a high quality of speech, and a good robustness are obtained. Furthermore, this technique can be introduced into a low bit rate encoding, of which the research is rarely seen in literature.

Considering a discrete orthogonal wavelet transform, assuming that there is a wavelet function $\Psi(x)$. This wavelet function $\Psi(x)$ has to meet certain requirements. By using this wavelet function $\Psi(x)$ as a prototype, through dilation and translation, a function sequence is obtained as:

$$\{\Psi_{j,k}=2^{j/2}\Psi(2^{-j}x-k)|j,k\in Z\}$$

where j, k are scale index and shift index, respectively.

This function sequence thus constructs a normalized orthogonal base in space of $L(R^2)$. For an arbitrary function f(x) in space $L(R^2)$, a wavelet transform is as:

$$w_{j,k} = \int_{-\infty}^{+\infty} f(x)\overline{\Psi_{j,k}(x)}\,dx \quad j,k \in Z$$

The inverse transform is defined as:

$$f(x) = \sum_{j,k \in Z} w_{j,k}\Psi_{j,k}(x)$$

By employing the wavelet transform, with a certain time and frequency resolution, a signal can be decomposed into an approximate component and a detailed component, that is, a low-pass component and a high-pass component, respectively. The decomposition is shown as FIG. 1. As shown in the figure, an input function f(x) is decomposed into a first low-pass component $w_1^H$ and a first high-pass component $w_1^G$. The low-pass component $w_1^H$ is further decomposed into a second pair of components, which comprises a second low-pass component $w_2^H$ and a second high-pass component $w_2^G$, whereas the first high-pass component $w_1^G$ remains as ever. Again, the second low-pass component $w_2^H$ is decomposed into a third pair of components, $w_3^H$ and $w_3^G$. By iterating the same process of decomposition, a wavelet transform is performed.

Wavelet packet transform is a further development of the wavelet transform. The wavelet packet transform is shown as FIG. 2. The wavelet packet transform has been adapted in speech encoding research. At first, properties of wavelet packet transform are applied for parameter extract, for example, pitch extract and envelope extract, in speech encoding. Later on, by combining wavelet packet transform, entropy encoding technique, and vector quantization technique, some algorithms of speech encoding are developed. For example, Tewfik et. al. employs the wavelet packet transform to perform a high quality encoding research of wide band audio. By wavelet packet transform, the critical band decomposition of an audio signal segment is identified. Averbuch et. al. develops an algorithm by combining the wavelet pack transform and the vector quantization technique.

An algorithm of speech encoding based on wavelet packet transform has been presented in literature. A wavelet packet transform with a fixed decomposition level is performed for an input speech signal segment. That is, the signal is transformed into a fixed time-frequency space. In the space, the time-frequency resolution is approximately the same as that of hearing system of human beings. Therefore, the transform is performed in both time and frequency domains, not only in frequency domain.

An encoding process for a method of speech compression is shown as FIG. 3. It has to be noted that the input signal is variable in a wide range, therefore, it is difficult to perform an effective decomposition by using the wavelet packet transform in a fixed domain. In addition, through wavelet packet transform, a signal band is dyadic (binary tree) decomposed flexibly. Theoretically, the performance of a best wavelet packet transform is achieved by defining a cost function, such as an entropy function or an energy function, first. Using the cost function as a standard to select how to perform a wavelet packet decomposition under a binary tree. The result of decomposition causes the function to be a maximum or a minimum. It is thus advantageous for process. However, in practice use, the cost of this method is too much to perform no matter under the consideration of time or complexity, especially in the application of speech encoding.

SUMMARY OF THE INVENTION

It is therefore an object of the invention to provide a method of signal compression. By employing wavelet packet transform, an input signal is compressed in different domains according to their characteristics.

To achieve these objects and advantages, and in accordance with the purpose of the invention, as embodied and broadly described herein, the invention is directed towards a method of signal compression. An input signal is divided into a plurality of segments. Each of the segments is decomposed by wavelet packet transform to a plurality of levels, so that each of the segments is in a form of a group of coefficients in each of a plurality of domains corresponding to each of the levels. Each of the domains is divided into a plurality of sub-domains to calculate a degree of characteristic concentration corresponding thereto. One of the domains having a highest degree of characteristic concentration is select to perform bit allocation and quantization, so that the group of coefficients in the selected domain is represented as an information. The information is formatted into a frame for transmission, and then output.

It is to be understood that both the foregoing general description and the following detailed description are exemplary and explanatory only and are not restrictive of the invention, as claimed.

DESCRIPTION OF THE PREFERRED EMBODIMENTS

In the invention, a method of multi-domain signal compression, for example, speech compression, based on wavelet packet transform is disclosed. The input signal is compressed at different time-frequency resolution according to their characteristic distribution, for example, energy distribution or entropy distribution, in these domains. The method is easy to implement and is effective at compressing signals such as speech signals or audio signals, even at bit rates as low as 2 kbits/s.

Firstly, input signals are divided into segments of $2^M$ points. Each segment is then decomposed by wavelet packet transform to levels of 0 to L. As a consequence, the segment is in a form of groups of coefficients. In this way, the finest frequency resolution will reach the narrowest width of critical band. Thus, the signal is represented by the corresponding group of coefficients in L+1 time-frequency domains. Each of the time-frequency domains has its own resolution. The domain corresponding to level 0 has the highest time resolution and the lowest frequency resolution. On the contrary, the domain corresponding to level L+1 has the lowest time resolution and the highest frequency resolution.

Figure 1:
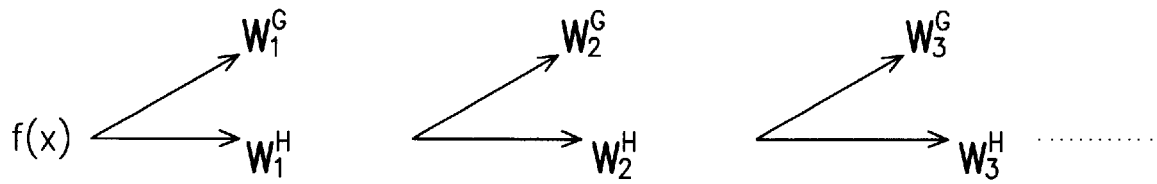
FIG. 1 shows a conventional wavelet transform.
Figure 2:
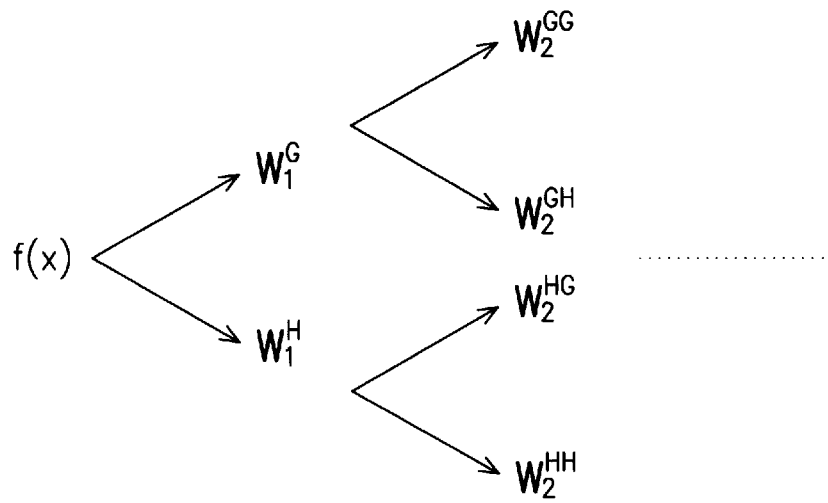
FIG. 2 shows a conventional wavelet packet transform.
Figure 3:
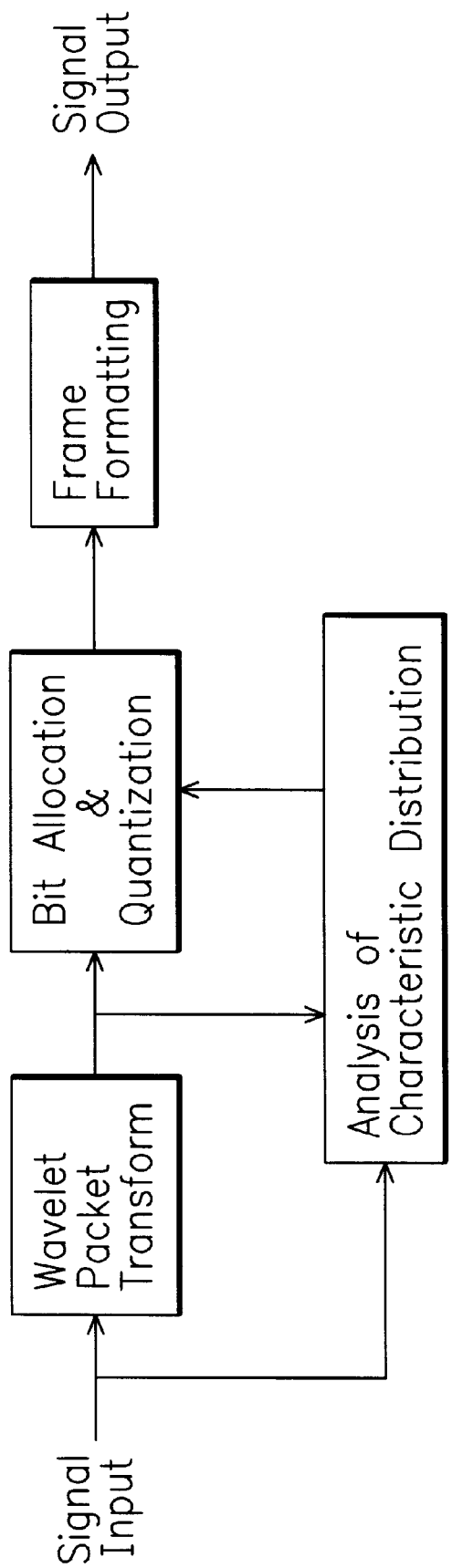
FIG. 3 shows a method of speech compression using wavelet packet transform.
Figure 4:
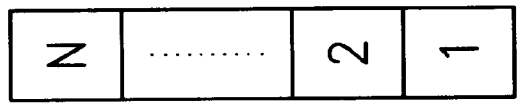
FIG. 4 shows the definition of subdomains in each domain in a method of signal compression according to the invention.
Figure 4:
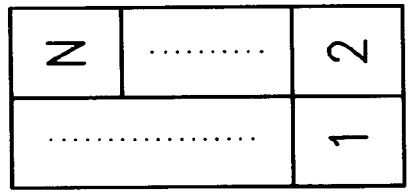
Figure 4:
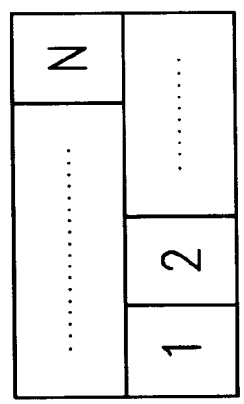
Figure 4:
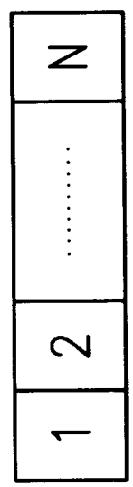

To decide in which domain a segment is to be compressed, the characteristic distribution, for example, the energy distribution in this embodiment, for each group of coefficients is analyzed. Each domain is evenly divided into N sub-domains as shown in FIG. 4, where N is an integer and determined according to the maximal decomposition level and the required bit. The sub-domains are marked as $B_{j,n}$, where n is an integer, n=1, . . . , N, and j is the decomposition level. Each of the sub-domains $B_{j,n}$ has the same number of transform coefficients. The transform coefficients at resolution $2^j$ are denoted as $w_{j,k}^m$, where m is the index of frequency bands, m=1, . . . , $2^j$, and k is the time index at resolution $2^j$. The energy of each sub-domain denoted as $E_{j,n}$ is:

$$E_{j,n} = \sum_{m,k \in B_{j,n}} (w_{j,k}^m)^2$$

The degree of energy concentration is defined as the ratio of the energy sum of Q subdomains with highest energy to the total energy of the segments, where Q is determined according to the required bit rate.

The compression is done in the domain with the highest degree of energy concentration. Therefore, a time domain signal, that is, a signal whose energy is more concentrated in a domain with a high time resolution, is compressed in the time domain. On the contrary, a frequency domain signal, that is, a signal whose energy is more concentrated in a domain with a high frequency resolution, is compressed in the frequency domain. This is the so-called "multi-domain signal compression" in the invention.

Based on the algorithm of the above mentioned "multi-domain signal compression", a method of signal compression is described as follows.

Figure 5:
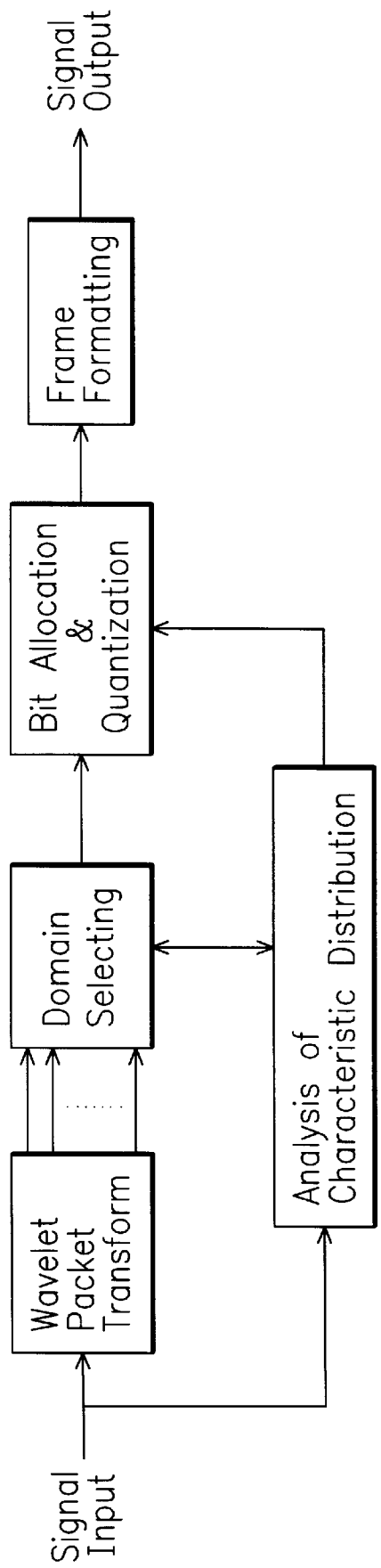
FIG. 5 shows a method of signal compression in a preferred embodiment according to the invention.

In FIG. 5, a method of signal compression based on multi-domain signal compression is shown. An input signal is divided into segments to be decomposed by wavelet packet transform. Each segment is thereafter in a form of groups of coefficients in multi-domains. According to the characteristic distribution, for example, energy distribution or entropy distribution, a domain which is most advantageous for quantization is selected among these multi-domains. According to characteristic distribution, bit allocation is performed in the selected domain. In this embodiment, energy is used as a criterion to carry out bit allocation. If the energy of a sub-domain is high, the sub-domain is important and certain bits are allocated thereto. The coefficients in the sub-domain are kept and coded. This process is repeated until all the available bits are used up. The total bits are determined according to the required bit rate.

Figure 6:
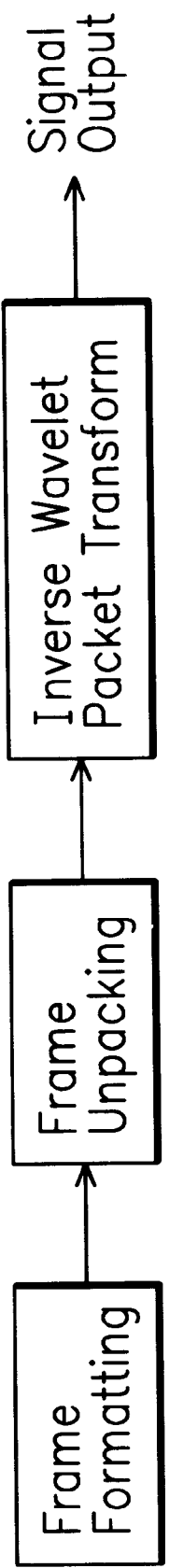
FIG. 6 shows an inverse wavelet packet transform.

After bit allocation, the coefficients which have non-zero bit allocation in each of the sub-domains of the selected domain are normalised with a scale factor before quantization, wherein the scale factor is chosen from the coefficients which have a maximal amplitude in one of the sub-domains of the selected domain. The group of coefficients in the selected domain is then quantized according to the number of bits allocated to that sub-domain with a simple quantizer. In the way, a segment of a signal is represented by the coded efficiencies, the index of the decomposition level, the indices of the sub-domains that have non-zero bit allocation, and the scale factors. All the information is then formatted into a frame for transmission. The frame is received and unpacked by a decoder, and then an inverse wavelet packet transform is carried out as shown in FIG. 6.

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of multi-domain signal compression, comprising the steps of:

dividing an input signal into a plurality of segments;

decomposing said segments by wavelet packet transform to a plurality of levels, so that said segments are in a form of a group of coefficients in a plurality of domains corresponding to said levels, wherein two physical variables are used to define said domains;

evenly dividing each of said domains into a plurality of sub-domains to calculate a degree of characteristic concentration corresponding thereto;

selecting one of said domains having a highest degree of characteristic concentration to perform bit allocation and quantization, so that the group of coefficients in the selected domain is represented as an information for the segment;

formatting the information into a frame for transmission; and outputting the frame.

2. The method according to claim 1, wherein the input signal comprises a video signal.

3. The method according to claim 1, wherein the input signal comprises an audio signal.

4. The method according to claim 1, wherein the degree of characteristic concentration comprises a degree of energy concentration.

5. The method according to claim 1, wherein the degree of characteristic concentration comprises a degree of entropy concentration.

6. The method according to claim 1, wherein after bit allocation, the coefficients which have non-zero bit allocation in each of the sub-domains of the selected domain are normalised with a scale factor before quantization, and the scale factor is chosen from the coefficients which have a maximal bit allocation in one of the sub-domains of the selected domain.

7. The method according to claim 1, wherein the information comprises a plurality of coded coefficients, an index of the decomposition level, a plurality of indices of the sub-domains which have non-zero bit allocation, and the scale factor.

8. The method according to claim 1, wherein after the frame is formatted, the frame is unpacked and processed by an inverse wavelet packet transform before being output.

9. The method according to claim 1, wherein the two physical variables comprise time and frequency.

10. A method of multi-domain acoustic signal compression, comprising the steps of:

dividing a speech signal of into a plurality of segments;

decomposing said segments by wavelet packet transform to a plurality of levels, so that said segments is in a form of a group of coefficients in a plurality of domains corresponding to said levels, wherein two physical variables are used to define said domains;

evenly dividing each of said domains into a plurality of sub-domains to calculate a degree of energy concentration corresponding thereto;

selecting one of said domains having a highest degree of energy concentration to perform bit allocation and quantization, so that the group of coefficients in the selected domain is represented as an information for the domain;

formatting the information into a frame for transmission; and outputting the frame.

11. The method according to claim 10, wherein the two physical variables comprise time and frequency.

* * * * *